(12) United States Patent
Wang et al.

(10) Patent No.: US 8,724,613 B2
(45) Date of Patent: *May 13, 2014

(54) METHOD AND DEVICE FOR SERVICE TIME DIVISION MULTIPLEXING

(75) Inventors: Junwei Wang, Beijing (CN); Xiaoan Fan, Beijing (CN); Jianghua Liu, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 155 days.

This patent is subject to a terminal disclaimer.

(21) Appl. No.: 13/404,590

(22) Filed: Feb. 24, 2012

(65) Prior Publication Data

US 2012/0155368 A1   Jun. 21, 2012

Related U.S. Application Data (63) Continuation of application No. 12/538,357, filed on Aug. 10, 2009, now Pat. No. 8,149,814, which is a continuation of application No. PCT/CN2008/070291, filed on Feb. 5, 2008.

(30) Foreign Application Priority Data

Feb. 12, 2007   (CN) .......................... 2007 1 0084514

(51) Int. Cl.
    *H04B 7/212*   (2006.01)
(52) U.S. Cl.
    USPC ............................ 370/347; 370/336; 370/312
(58) Field of Classification Search
    USPC ......... 370/347, 473, 329, 330, 337, 342, 345, 370/464
    See application file for complete search history.

(56) References Cited

U.S. PATENT DOCUMENTS

| | | | |
|---|---|---|---|
| 7,586,874 B2 | 9/2009 | Rudolf et al. | |
| 7,949,299 B2* | 5/2011 | Rudolf et al. | ................ 455/3.06 |
| 2003/0123414 A1 | 7/2003 | Tong et al. | |
| 2003/0174645 A1 | 9/2003 | Paratainen et al. | |
| 2004/0147228 A1* | 7/2004 | Krasner | .......................... 455/73 |

(Continued)

FOREIGN PATENT DOCUMENTS

| | | |
|---|---|---|
| CN | 1418418 A | 5/2003 |
| CN | 1476259 A | 2/2004 |

(Continued)

OTHER PUBLICATIONS

International Search Report received in the Patent Cooperation Treaty Application No. PCT/CN2008/070291, mailed May 15, 2008, 4 pages.

Written Opinion of the International Searching Authority received in Patent Cooperation Treaty Application No. PCT/CN2008/070291, mailed May 15, 2008, 3 pages.

(Continued)

*Primary Examiner* — Donald Mills
*Assistant Examiner* — Henry Baron
(74) *Attorney, Agent, or Firm* — Huawei Technologies Co., Ltd (57) ABSTRACT

A method and device for service time division multiplexing as well as a method and a device for transmitting service are disclosed. The method for service time division multiplexing includes: selecting a part or all of radio frames in one time unit as specific radio frames; and selecting a part or all of subframes in the specific radio frames as specific subframes for sending a specific service. The specific service is a multimedia broadcast multicast service, or a unicast service, or one or more than one kind of services transmitted in broadcast or multicast mode.

16 Claims, 7 Drawing Sheets

(56) References Cited

U.S. PATENT DOCUMENTS

| | | |
|---|---|---|
| 2005/0026607 A1 | 2/2005 | Hwang et al. |
| 2005/0237972 A1 | 10/2005 | Van Dervelde et al. |
| 2006/0092901 A1 | 5/2006 | Parantainen |
| 2006/0098688 A1 | 5/2006 | Parkvall et al. |
| 2006/0104225 A1 | 5/2006 | Kim et al. |
| 2006/0156370 A1 | 7/2006 | Parantainen |
| 2008/0089312 A1 | 4/2008 | Malladi et al. |

FOREIGN PATENT DOCUMENTS

| | | |
|---|---|---|
| CN | 1567773 A | 1/2005 |
| CN | 1909533 A | 2/2007 |
| CN | 101119504 A | 2/2008 |
| CN | 101151818 A | 3/2008 |
| EP | 1 585 351 A1 | 10/2005 |
| WO | WO 01/54337 A1 | 7/2001 |
| WO | WO 2005/043829 A2 | 5/2005 |

OTHER PUBLICATIONS

Chinese Office Action, Application No. 200710084514.X, dated Mar. 1, 2010, 21 pages.

3GPP TR 25.814 V7.1.0 (Sep. 2006), "3$^{rd}$ Generation Partnership Project; Technical Specification Group Radio Access Network; Physical layer aspects for evolved Universal Terrestrial Radio Access (UTRA) (Release 7)," dated Sep. 2006, 132 pages.

Chinese Search Report received in Application No. 2011102660515, mailed Apr. 8, 2013, 2 pages.

Huawei, "MBSFN Subframe Indication," 3GPP TSG-RAN-WG1 Meeting #48bis, R1-071690, St. Julians, Malta, Mar. 26-30, 2007, 3 pages.

Extended European Search Report received in Application No. 08706664.3-1505, Applicant: Huawei Technologies Co., Ltd., mailed Feb. 18, 2013; 8 pages.

United States Office Action received in U.S. Appl. No. 13/404,956 mailed Oct. 10, 2013, 9 pages.

\* cited by examiner

METHOD AND DEVICE FOR SERVICE TIME DIVISION MULTIPLEXING

CROSS-REFERENCE TO RELATED APPLICATIONS

This application is a continuation of U.S. patent application Ser. No. 12/538,357, filed on Aug. 10, 2009, which is a continuation of International Patent Application No. PCT/CN2008/070291, filed on Feb. 5, 2008, which claims priority to Chinese Patent Application No. 200710084514.X, filed on Feb. 12, 2007, each of which is incorporated herein by reference in its entirety.

This application is related to concurrently filed application Ser. No. 13/404,956, which claims the same priority.

TECHNICAL FIELD

The embodiments of the present invention relates to the communication technical field, in particular to a method and device for service time division multiplexing.

BACKGROUND

The third generation partnership projects (3GPP) initiated a long term evolution (LTE) of the 3rd generation (3G) in 2005, and better support for increasing service requirements of operators and users is provided through evolved universal terrestrial radio access (E-UTRA) and an evolved universal terrestrial radio access network (E-UTRAN).

In an LTE system, downlink communication services can be divided into two categories, that is, a unicast service and a multimedia broadcast multicast service (MBMS). The unicast service refers to a point-to-point service in which one data source sends data to one user equipment, and the MBMS refers to a point-to-multipoint service in which one data source sends data to multiple user equipment. The introduction of the MBMS is to realize resource sharing on a network; the network includes a core network and a radio access network and serves maximum multimedia user equipment having the same requirements by using minimum resources. In the radio access network, the MBMS can realize the multicast and broadcast of messages with plain texts at a low rate and realize the multicast and broadcast of multimedia services at a higher rate on a common transport channel and a common radio bearer.

For the MBMS, the specification 25.814 of the 3GPP supports two cell transmission modes, one of which is a multi-cell transmission mode, that is, multiple cells simultaneously send the MBMS with the same frequency resource, and the other of which is a single-cell transmission mode, that is, a single cell sends the MBMS without considering the transmission of other cells.

Data transmission modes of the MBMS include two modes, one of which is a mixed carrier (MC) mode, that is, the MBMS and the unicast service share the same carrier to transmit data, and the other of which is a dedicated carrier (DC) mode, that is, the MBMS itself uses one carrier to transmit data. In the case of the MC mode, the MBMS and the unicast service are in time division multiplexing, and the two services are subframe-level time division multiplexing decided by a 3GPP meeting, that is, each service occupies at least one subframe. If a base station does not send a signaling to inform the usage of each subframe, unicast service user equipment and MBMS user equipment will attempt to read their own service information through all the transmission time, thus wasting electric energy of the user equipment. If one bit of information is set for each subframe to indicate the usage, for example, one bit has two states, 0 and 1, corresponding to the two services respectively, then the required information amount is very large.

In addition, an orthogonal frequency division multiplexing (OFDM) technology is employed in the downlink of LTE. The OFDM technology divides a given channel into multiple orthogonal subchannels in a frequency domain, and allows subcarrier spectra to be partially overlapped. As long as mutual orthogonality is met among the subcarriers, data signals can be obtained. In the operation of an OFDM system, symbols are firstly subject to serial/parallel conversion to form multiple low-rate sub-data streams, each data stream occupies one subcarrier, the mapping from the sub-data streams to the subcarriers can be achieved through an inverse discrete Fourier transform (IDFT) or an inverse fast Fourier transform (IFFT), and a cyclic prefix (CP) as a guard interval is applied, which greatly reduces or even eliminates inter-symbol interference, and ensures orthogonality among various channels, thus greatly reducing inter-channel interference.

In the subframe which sends the unicast service or a single-cell transmission MBMS, the length of the CP only needs to meet the requirements of the serving cell. In the subframe of a multi-cell transmission MBMS, signal needs to pass through a longer transmission path, in which case a longer CP is required to overcome inter-symbol interference and user equipment can successfully demodulate a subframe only after knowing the length of the CP of the subframe.

To sum up, the base station cannot effectively inform the transmission time of various services and the length of the CP of each subframe in the case of time division multiplexing for multiple services in the prior art.

SUMMARY OF THE INVENTION

Various embodiments of the present invention provide a method and device for service time division multiplexing, a method and a device for transmitting service, and a base station, which are to solve the problem a base station cannot effectively inform the transmission time of various services and the length of the CP of each subframe in the case of time division multiplexing for multiple services in the prior art.

A method for service time division multiplexing includes: selecting a part or all of radio frames in one time unit as specific radio frames; and selecting a part or all of subframes in the specific radio frames as specific subframes for sending a specific service.

The specific service is a multimedia broadcast multicast service (MBMS), or a unicast service, or one or more than one kinds of services transmitted in broadcast or multicast mode.

A method for transmitting service includes: dividing one time unit into at least one Type 1 subunit and selecting a part or all of Type 1 subunits as specific Type 1 subunits; dividing each Type n subunit into at least one Type n+1 subunit, where 1≤n≤N, and n and N are natural numbers, selecting a part or all of Type n+1 subunits in specific Type n subunits as specific Type n+1 subunits, the specific Type N subunits being used for sending a specific service; sending the service according to the above time division multiplexing mode; and sending position information of the N types of specific subunits.

A method for transmitting service includes: selecting a part or all of the radio frames in one time unit as specific radio frames; selecting a part or all of subframes in the specific radio frames as specific subframes for sending a specific service; sending the service according to the above time division multiplexing mode; and sending position information of the specific radio frames and/or position information of the specific subframes.

The time unit comprises several radio frames, each of which contains R subframes that can be allocated to the specific service, where R is a natural number.

A device for service time division multiplexing includes: a radio frame selection unit, configured to select a part or all of radio frames in one time unit as specific radio frames; and a subframe selection unit, configured to select a part or all of subframes in the specific radio frames as specific subframes for sending a specific service.

A device for transmitting service includes: a time division multiplexing unit, configured to select a part or all of radio frames in one time unit as specific radio frames; and select a part or all of subframes in the specific radio frames as specific subframes for sending a specific service; and a transmission unit, configured to send the service according to a time division multiplexing mode determined by the above time division multiplexing unit and send position information of the specific radio frames and/or position information of the specific subframes.

A base station includes: a device for transmitting service, configured to select a part or all of radio frames in one time unit as specific radio frames, select a part or all of subframes in the specific radio frames as specific subframes for sending a specific service, send the service according to the above time division multiplexing mode, and send position information of the specific radio frames and/or position information of the specific subframes.

The embodiments of the present invention provides a service time division multiplexing mode through a technical proposal in which a part or all of radio frames in one time unit are selected as specific radio frames and a part or all of the subframes in the specific radio frames are selected as specific subframes for sending a specific service which is the multimedia broadcast multicast service, or the unicast service, or one or more than one kinds of services transmitted in the multimedia broadcast multicast mode; furthermore, in the embodiments of the present invention, through a technical proposal in which services are sent according to the time division multiplexing mode, the position information of the specific radio frames and/or the position information of the specific subframes are also sent, the time unit includes several radio frames, and the radio frames includes one or more subframes that may be allocated to the specific service, it is achieved that when the base station sends multiple services to user equipment through the time division multiplexing mode, the user equipment for various services can accurately obtain the transmission time of the services required by the user equipment itself, thus obtaining service data required by the user equipment itself, thereby saving electric energy of the user equipment. Meanwhile, the present invention realizes that the user equipment can accurately know the length of the CP of each subframe by sending length information of the CPs of the specific subframes in the time unit, thus exactly demodulating the subframes.

DETAILED DESCRIPTION OF ILLUSTRATIVE EMBODIMENTS

In the case of multi-service time division multiplexing, in order to allow user equipment to know that a subframe is used by which service, embodiments of the present invention provide a service time division multiplexing method and device, as well as a method and a device for transmitting service.

One time unit is divided into at least one Type 1 subunit, and a part or all of the Type 1 subunits are selected as specific Type 1 subunits. Each of Type n subunits is divided into at least one Type n+1 subunits, where $1 \leq n \leq N$, and n and N are natural numbers. A part or all of the Type n+1 subunits in the specific Type n subunits are selected as specific Type n+1 subunits, and the Type N subunits are used for sending a specific service. The service is sent according to the above time division multiplexing mode. Position information of N kinds of the specific Type n subunits is sent. That is, in the embodiments of the present invention, the service is multiplexed in the way of dividing one time unit into N layers by dividing one time unit into Type 1 subunits, dividing each of the Type 1 subunits into Type 2 subunits, and dividing each of the Type 2 subunits into Type 3 sub-time units and so on.

Figure 1:
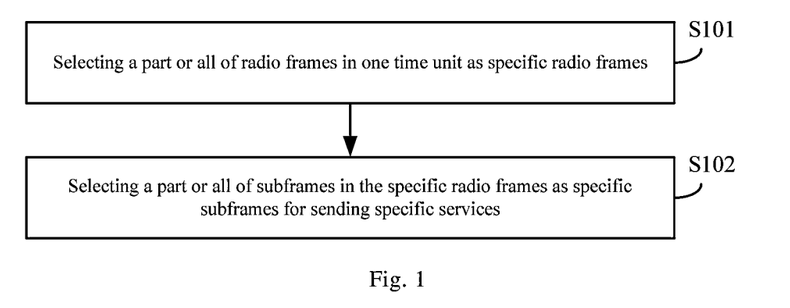
FIG. 1 is a schematic flow diagram of a method for service time division multiplexing of the present invention.

Referring to FIG. 1, in an embodiment of dividing one time unit into two layers, a method for service time division multiplexing includes the following steps:

In step S101, a part or all of radio frames in one time unit are selected as specific radio frames.

The size of the time unit can be changed, that is, the number of the radio frames included in the time unit may be changed.

In step S102, a part or all of subframes in the specific radio frames are selected as specific subframes for sending a specific service.

The specific service is a multimedia broadcast multicast service, or a unicast service, or one or more than one services transmitted in broadcast or multicast mode. Particularly, when the specific service is the multimedia broadcast multicast service or the unicast service, the present invention is to solve the problems in the prior art.

The allocation of the specific radio frames in the time unit can be predefined according to characteristics of the specific service. For example, both of base stations and user equipment pre-store a mapping table or mapping rules. Therefore, when the number of the specific radio frames in the time unit is given, the base stations and the user equipment can know which radio frames are specific radio frames by looking up the mapping table or by calculating according to the mapping rules. For example, the mapping rule may be that the specific radio frames are evenly allocated. In this way, specific positions of the radio frames can be determined if the number or the interval of the radio frames is determined, thus simplifying multiplexing design. The mode, such as explicit signaling, may be employed rather than employing the predetermined mode.

In order to further simplify the multiplexing design, the allocation of the specific subframes can be required to be the same for every specific radio frame. In this way, specific positions of all specific subframes in the time unit can be determined only by determining the positions of specific subframes in one specific radio frame. The allocation of the specific subframes may not be necessarily the same.

Further, the allocation of the specific subframes in the radio frame that the specific subframes belong to can be required to be predefined without need of notification. For example, both of the base stations and the user equipment prestore the mapping table or the mapping rules, therefore, when number of the specific subframes in one specific radio frame is given, the base stations and the user equipment can obtain which subframes are specific subframes by looking up the mapping table or by calculating according to the mapping rules. For example, the specific subframes can be required to be evenly allocated or allocated at an approximately equal interval in the radio frame that the specific subframes belong to.

The specific positions of the specific subframes can be determined only by determining the number or the interval of the specific subframes in one specific radio frame. The even allocation and the approximate even allocation are hereinafter referred to as the even allocation. The mode such as explicit signaling rather than the predetermined mode, may be employed.

Figure 2:
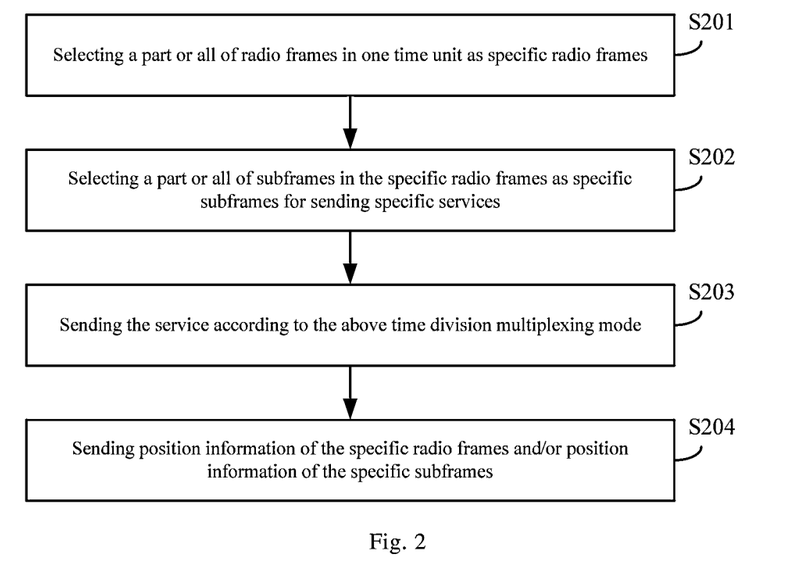
FIG. 2 is a schematic flow diagram of a method for transmitting service of the present invention.

Referring to FIG. 2, a method for transmitting service of the present invention includes the following steps:

In step S201, a part or all of radio frames in one time unit are selected as specific radio frames.

The time unit includes several radio frames, each of the radio frames contains R subframes that may be allocated to the specific service, and R is a natural number.

In step S202, a part or all of subframes in the specific radio frames are selected as specific subframes for sending the specific service.

The specific service may be a multimedia broadcast multicast service, or a unicast service, or one or more than one kinds of services transmitted in broadcast or multicast mode. Particularly, when the specific service is the multimedia broadcast multicast service or the unicast service, the present invention is to solve the problems of the prior art.

The allocation of the specific radio frames in the time unit can be predefined according to the characteristics of the specific service. For example, both of base stations and user equipment pre-store a mapping table or mapping rules, therefore, when number of the specific radio frames in the time unit is given, the base stations and the user equipment can obtain which radio frames are specific radio frames by looking up the mapping table or by calculating according to the mapping rules. For example, the mapping rules may be that the specific radio frames are evenly allocated. In this way, specific positions of the radio frames can be determined if the number or the interval of the radio frames is determined, thus achieving the purpose of simplifying multiplexing design. The mode, such as explicit signaling rather than the predetermined mode, may be employed.

In order to further simplify the multiplexing design, the allocation specific subframes can be required to be the same for every specific radio frame. In this way, specific positions of all specific subframes in the time unit can be determined only by determining the positions of specific subframes in one specific radio frames.

Further, the allocation of the specific subframes in the radio frame that the specific subframes belong to can be required to be predefined without need of notification. For example, both of the base stations and the user equipment prestore the mapping table or the mapping rules, therefore, when number of the specific subframes in one specific radio frame is given, the base stations and the user equipment can obtain which subframes are specific subframes by looking up the mapping table or by calculating according to the mapping rules. For example, the specific subframes can be required to be evenly allocated or allocated at an approximately equal interval in the radio frame that the specific subframes belong to. The specific positions of the specific subframes can be determined only by determining the number or the interval of the specific subframes in one specific radio frame. The even allocation and the approximate even allocation are hereinafter referred to as the even allocation. The mode, such as explicit signaling rather than the predetermined mode, may be employed.

In step S203, the service is sent according to the above time division multiplexing mode.

In step S204, the position information of the specific radio frames and/or the position information of the specific subframes are sent.

Preferably, the position information of the specific radio frames is the number or the interval of the specific radio frames in the time unit.

Preferably, the position information of the specific subframes is the number or the interval of the specific subframes in each of the specific radio frames.

Preferably, the position information of the specific radio frames and/or the position information of the specific subframes are transmitted on broadcast channels.

The position information of the specific radio frames is hereinafter referred to as first information, and the position information of the specific subframes is hereinafter referred to as second information.

The broadcast channels include a main broadcast channel, a secondary broadcast channel and a dynamic broadcast channel. The first information is transmitted on any one of the three broadcast channels, and the second information is transmitted on any one of the three broadcast channels.

Preferably, the second information is transmitted on the main broadcast channel, and the first information is transmitted on the secondary broadcast channel or the dynamic broadcast channel.

The broadcast channels are transport channels, the three transport channels are required to be mapped to one or more physical channels for transmission. For example, the main broadcast channel is mapped to a physical main broadcast channel, the dynamic broadcast channel is mapped to a physical shared data channel, and the secondary broadcast channel is mapped to a physical secondary broadcast channel or the physical shared data channel.

Preferably, the method for transmitting service further includes sending length information of CPs of the specific subframes in the time unit.

Preferably, the length information of the CPs is transmitted on the broadcast channel.

Taking MBMS, which is the specific service, and unicast service time division multiplexing as an example, if the service in all MBMS subframes (specific subframes sending the MBMS) is transmitted in multiple cells, then all the MBMS subframes use long CPs; if the MBMS transmitted in a single cell is sent in unicast subframes, then the first information and the second information are also used for informing the length of the CPs, that is, all MBMS subframes use the long CPs, and all unicast subframes use short CPs.

If the service in the MBMS subframes is possibly transmitted in multiple cells, and is also possibly transmitted in a single cell, then it is supposed that the service in all the MBMS subframes is transmitted in multiple cells or transmitted in a single cell in the time unit, then the method for transmitting service further includes sending the length information of the CPs of the specific subframes in the time unit, and the length information is hereinafter referred to as third information. That is, a user can obtain the length of the CP of each subframe in the entire time unit only by increasing one bit of signaling to inform the MBMS subframes of using the long CP or the short CP. For example, the one bit of signaling is set as 0, which represents the long CP, and the one bit of signaling is set as 1, which represents the short CP, vice versa, the one bit of signaling is set as 1, which represents the long CP, and the one bit of information is set as 0, which represents the short CP.

Figure 3:
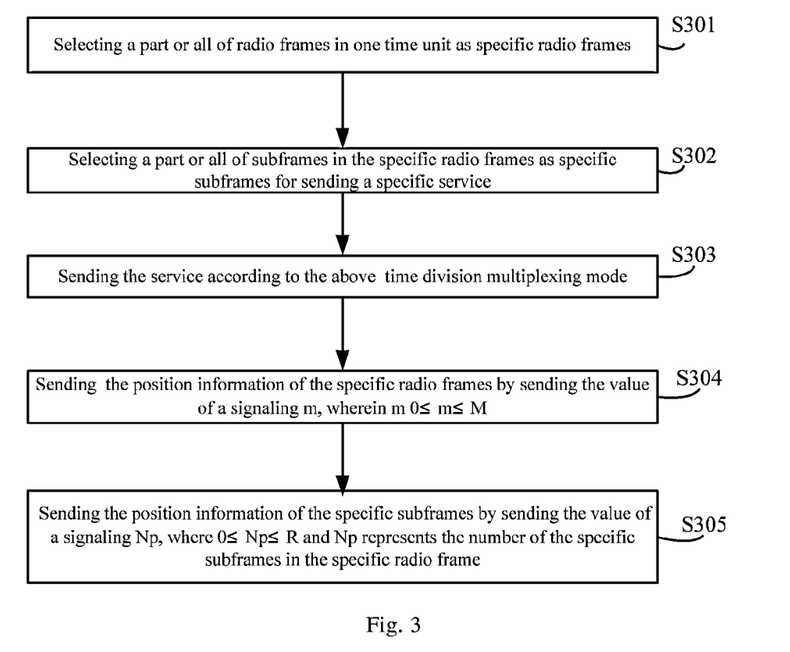
FIG. 3 is a schematic flow diagram of an embodiment of a method for transmitting service of the present invention.

A first embodiment will be described now. Referring to FIG. 3, a method for transmitting service of the present invention includes the following steps.

In step S301, a part or all of radio frames in one time unit are selected as specific radio frames.

In step S302, a part or all of subframes in the specific radio frames are selected as specific subframes for sending a specific service.

In step S303, the service is sent according to the above time division multiplexing mode.

In step S304, position information of the specific radio frames is sent by sending the value of a signaling m, and $0 \leq m \leq M$.

S successive radio frames form one time unit, where $S=2^M$, and the value of M may be 10 or other numerical values.

The specific radio frames are evenly allocated, and $2^m$ is used to represent the number of the specific radio frames in the time unit or represent the interval of various specific radio frames. If $2^m$ is used to represent the number of the specific radio frames in the time unit, then the interval of various specific radio frames is $2^{M-m}$, vice versa, if $2^m$ is used to represent the interval of various specific radio frames, then the number of the specific radio frames in the time unit is $2^{M-m}$, where $0 \leq m \leq M$.

In step S305, the position information of the specific subframes is sent by sending the value of a signaling Np, where $0 \leq Np \leq R$ and Np represents the number of the specific subframes in the specific radio frame.

Specific subframe does not exist in the entire time unit when Np=0, in this case, the value of m is not required to be indicated.

R represents that the radio frame includes R subframes that may be allocated to the specific service. One radio frame occupies 10 ms. When all subframes can be allocated to the specific service, the value of R is temporarily determined as 10 in LTE system. When some subframes cannot be used for sending the specific service, for example, when the subframes in which a synchronization channel (SCH) is located can only be used for the unicast subframes, the value of R is the number of other subframes in one radio frame. For example, when two subframes in one radio frame have the SCH, the value of R is 8.

In the present embodiment, the allocation of the specific subframes is the same for every specific radio frame.

It is described how to determine which subframes in one specific radio frame are the specific subframes after knowing the value of Np by taking approximate even allocation of the specific subframes in the specific radio frame that the specific subframes belong to as an example.

A simple way is as follows.

Subframes with serial number of r are specific subframes, and the value of r is calculated with the following formula:

$$s = \left\lceil \frac{10}{Np} \right\rceil$$

$$r = r_0 + (i \cdot s) \bmod 10 + \left\lfloor \frac{i \cdot s}{10} \right\rfloor, i = 0, 1, \ldots, Np - 1$$

In the formula, $r_0$ is the position of a first specific subframe in the specific radio frame, is expressed by the serial number of the subframe. Generally, $r_0=0$ can be adopted.

When the value of R is not the number of all subframes in one radio frame, after knowing the value of Np, the positions of the specific subframes can be also determined by the above method, but the serial number of the subframes in the formula is the serial number of other subframes.

Figure 4:
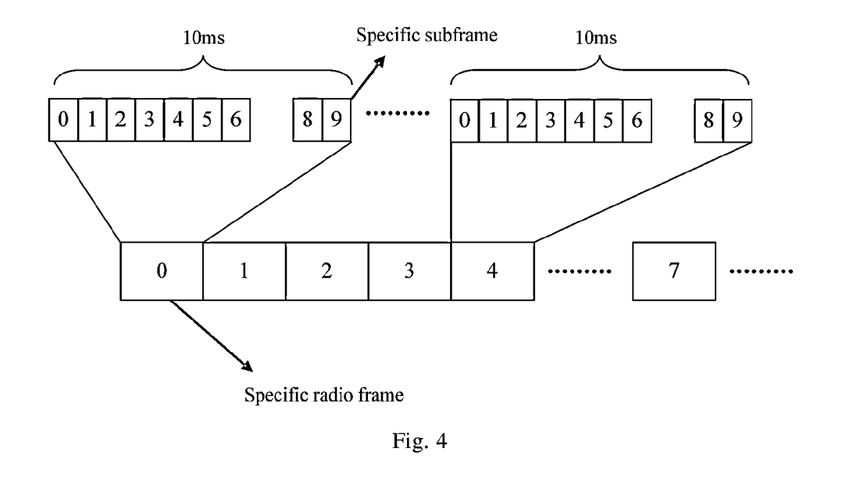
FIG. 4 is a schematic diagram of a multiplexing mode of specific subframes and nonspecific subframes in an embodiment of a method for transmitting service of the present invention.

FIG. 4 is a schematic diagram of a multiplexing mode of specific subframes and nonspecific subframes in the present embodiment. For example, a notification m=2 represents the interval of specific radio frames is 4 radio frames, and a first radio frame of the time unit includes specific subframes. A notification Np=4 represents the specific radio frame has 4 specific subframes which are evenly allocated, and the first subframe is a specific subframe, that is, $r_0=0$.

The information sent in the step S304 is the first information, the information sent in the step S305 is the second information, and the first information and the second information are transmitted on broadcast channels.

The broadcast channels include a main broadcast channel, a secondary broadcast channel and a dynamic broadcast channel. The first information is transmitted on any one of the three broadcast channels, and the second information is transmitted on any one of the three broadcast channels.

Preferably, when the first information and/or the second information is transmitted on the secondary broadcast channel, the secondary broadcast channel needs to be predefined to be placed on subframe of the long CP, or placed on the subframe of the short CP.

Preferably, when the first information and/or the second information is transmitted on the dynamic broadcast channel, the dynamic broadcast channel is determined to be placed on the subframe of the long CP, or placed on the subframe of the short CP.

Figure 5:
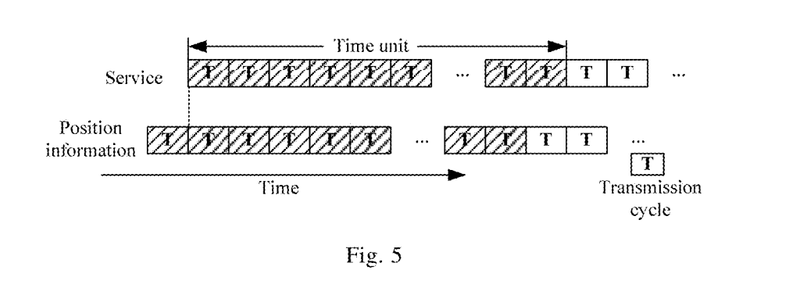
FIG. 5 is a schematic diagram of transmission delay between information and service data in an embodiment of a method for transmitting service of the present invention.

When the first information and the second information are transmitted on the main broadcast channel, as bit number accommodated in the main broadcast channel is limited and it is generally acknowledged as 40-50 bits, all of the position information cannot be put on one main broadcast channel, then the information is required to be split into multiple parts, each part is transmitted on one main broadcast channel. One main broadcast channel appears once in each radio frame. Therefore, the position information requires time transmission of multiple radio frames, and this time is an information transmission cycle T. FIG. 5 is a schematic diagram of transmission delay between position information and service data in the present embodiment. The signaling is repeatedly sent in one time unit. In a first transmission cycle of one time unit, the position of specific subframes is informed by the signaling of the last transmission cycle of the previous time unit, therefore, signaling content has a leading time T corresponding to the position of the specific subframes indicated by the signaling content.

As value range of m is 0≤m≤M, and the value range of Np is 0≤Np≤R, the bit number required to transmit the position information is $\log_2(M+1)+\log_2(R+1)$.

The user equipment determines the positions of the specific radio frames in the time unit according to the value of m, that is, the number or the interval of the specific radio frames; determines the positions of the specific subframes according to the value of Np, that is, the number or the interval of the specific subframes, reads the specific service on the subframes which transmit the specific service, and reads other services on the subframes which transmit other services.

Figure 6:
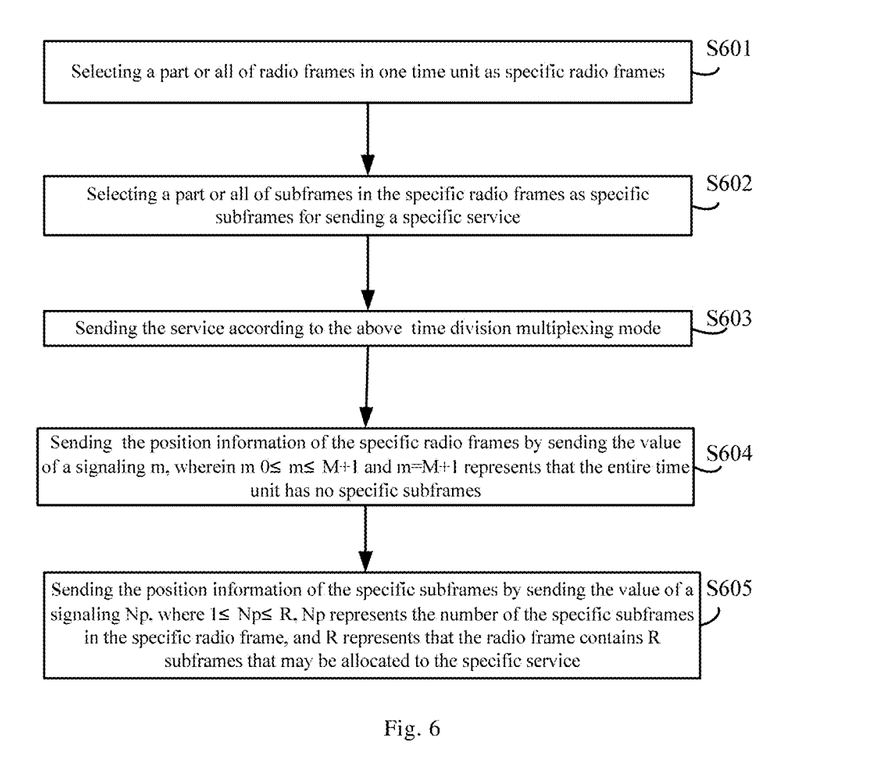
FIG. 6 is a schematic flow diagram of a method for transmitting service according to an embodiment of the present invention.

A second embodiment will be described now. Referring to FIG. 6, a method for transmitting service of the present invention includes the following steps.

In step S601, a part or all of radio frames in one time unit are selected as specific radio frames.

In step S602, a part or all of subframes in the specific radio frames are selected as specific subframes for sending a specific service.

In step S603, the service is sent according to the above time division multiplexing mode.

In step S604, position information of the specific radio frames is sent by sending the value of a signaling m, where 0≤m≤M+1, and m=M+1 represents that the entire time unit has no specific subframe.

S successive radio frames form one time unit, $S=2^4$, and the value of M may be 10 or other numerical values.

The specific radio frames are evenly spaced, and $2^m$ is used to represent the number of the specific radio frames in the time unit or represent the interval of various specific radio frames. If $2^m$ is used to represent the number of the specific radio frames in the time unit, then the interval of various specific radio frames is $2^{M-m}$, vice versa, if $2^m$ is used to represent the interval of various specific radio frames, then the number of the specific radio frames in the time unit is $2^{M-m}$, where 0≤m≤M+1. m=M+1 represents that the entire time unit has no specific subframe.

In step S605, the position information of the specific subframes is sent by sending the value of a signaling Np, where 1≤Np≤R, and Np represents the number of specific subframes in the specific radio frame; and R represents that the radio frame contains R subframes that may be allocated to the specific service.

When m=M+1, the value of Np is not required to be indicated.

In the present embodiment, the allocation of the specific subframes is the same for every specific radio frame.

After knowing the value of Np, the method for determining the position of the specific subframes is the same as that of the embodiment one.

The information sent in the step S604 is the first information, the information sent in the step S605 is the second information, and the first information and the second information are transmitted on the broadcast channels. The specific transmission mode is the same as that of the embodiment one.

As value range of m is 0≤m≤M+1, and the value range of Np is 1≤Np≤R, the total bit number for transmitting the position information is $\lceil\log_2(M+2)+\log_2 R\rceil$.

Figure 7:
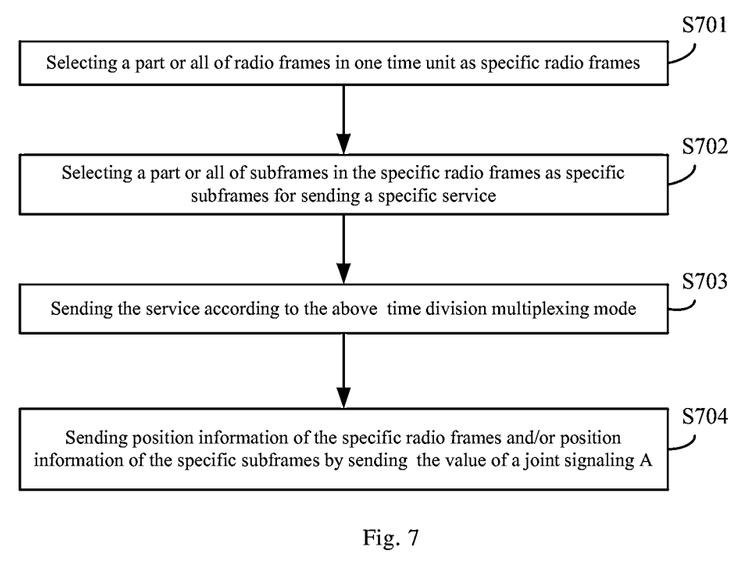
FIG. 7 is a schematic flow diagram of a method for transmitting service according to an embodiment of the present invention.

A third embodiment will be described now. The method for transmitting service of the present invention includes the following steps.

In step S701, a part or all of radio frames in one time unit are selected as specific radio frames.

In step S702, a part or all of subframes in the specific radio frames are selected as specific subframes for sending a specific service.

In step S703, the service is sent according to the above time division multiplexing mode.

In step S704, the position information of the specific radio frames and the position information of the specific subframes are sent by sending the value of a joint signaling A.

S successive radio frames form one time unit, where $S=2^M$, $2^m$ represents the number of the specific radio frames in the time unit or represents the interval of the specific radio frames, Np represents the number of the specific subframes in the specific radio frame, and R represents that the radio frame contains R subframes that may be allocated to the specific service.

In order to further save signaling, the position of the specific subframes can be indicated by adopting a joint signaling indication method, that is, values of m and Np are sent by sending the signaling A. The specific methods are as follows:

If $0 \le m \le M$, $0 \le Np \le R$, and $R \le M + 1$, then $$A = \begin{cases} 0, & \text{when } Np = 0 \\ (M+1)(Np-1) + (m+1), & \text{when } 0 < Np \le R; \end{cases} \quad (1)$$

In the formula, Np=0 represents that the entire time unit has no specific subframe.

If $0 \le m \le M$, $0 \le Np \le R$, and $M + 1 \le R$, then $$A = \begin{cases} 0, & \text{when } Np = 0 \\ Rm + Np, & \text{when } 0 < Np \le R; \end{cases} \quad (2)$$

In the formula, Np=0 represents that the entire time unit has no specific subframe.

If $0 \le m \le M + 1$, $1 \le Np \le R$, and $R \le M + 1$, then $$A = \begin{cases} 0, & \text{when } m = M + 1 \\ (M+1)(Np-1) + (m+1), & \text{when } 0 \le m \le M + 1; \end{cases} \quad (3)$$

In the formula, m=M+1 represents that the entire time unit has no specific subframe.

If $0 \leq m \leq M+1$, $1 \leq Np \leq R$, and $M+1 \leq R$, then $$A = \begin{cases} 0, & \text{when } m = M+1 \\ Rm + Np, & \text{when } 0 \leq m \leq M+1; \end{cases} \quad (4)$$

In the formula, m=M+1 represents that the entire time unit has no specific subframe.

In the case of R=M+1, any one of the above expression methods can be used.

It is described how to determine the value of m and Np after knowing the value of the signaling A:

It is supposed that two integer variables X and Y are given, where $a_1 \leq X \leq a_2$, $b_1 \leq Y \leq b_2$ and $a_2 - a_1 \leq b_2 - b_1$.

A function A is obtained from the following formula:

$$A = (b2-b1+1)(X-a1) + (Y-b1+1) \quad (5)$$

Values of X and Y can be solved through the following formulas if the value of A is given:

$$X = a_1 + \left\lfloor \frac{A}{b_2 - b_1 + 1} \right\rfloor \quad (6)$$

$$Y = A \bmod (b2 - b1 + 1) \quad (7)$$

When the encoding of the signaling A uses the formula (1) or (3), Np=X, m=Y, and the values of Np and m can be obtained through the formulas (6) and (7).

When the encoding of the signaling A uses the formula (2) or (4), m=X, Np=Y, and the values of Np and m can be obtained through the formulas (6) and (7);

It can be seen that when the sent signaling is A, bit number required to transmit the position information is $\lceil \log_2(M+2)+R+1 \rceil$ which is possibly less than information amount $\lceil \log_2(M+1)+\log_2(R+1) \rceil$ or $\lceil \log_2(M+2)+\log_2 R \rceil$ for respectively sending the signaling m and Np.

For example, when R=10, and M=8, 9, 10, 11, 16, 17, etc., 1 bit can be easily saved by the joint signaling. For example, when M=1 and $0 \leq A \leq 121$, A can be expressed by 7 bits while m and Np are respectively expressed by 4 bits. Therefore, 1 bit of information can be saved by adopting the joint signaling.

In the present embodiment, the specific radio frames are evenly allocated.

In the present embodiment, the allocation of the specific subframes is the same for every specific radio frame.

After knowing the value of Np, the method for determining the position of the specific subframes is the same as that of the embodiment one.

The information sent by the signaling A includes the first information and the second information which are transmitted on the broadcast channels. The specific transmission mode is exactly the same as that of the embodiment one.

Figure 8:
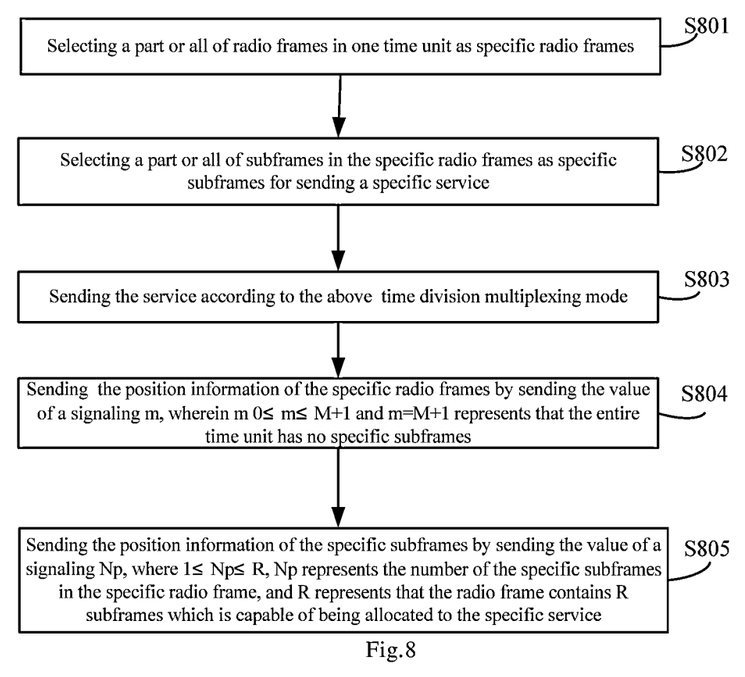
FIG. 8 is a schematic flow diagram of a method for transmitting service according to an embodiment of the present invention.

A fourth embodiment will be described now. Referring to FIG. 8, a method for transmitting service of the present invention includes the following steps.

In step S801, a part or all of radio frames in one time unit are selected as specific radio frames.

In step S802, a part or all of subframes in the specific radio frames are selected as specific subframes for sending a specific service.

In step S803, the service is sent according to the above time division multiplexing mode.

In step S804, the position information of the specific radio frames is sent by sending the value of a signaling m, where $0 \leq m \leq M+1$, and m=M+1 represents that the entire time unit has no specific subframe.

S successive radio frames form one time unit, $S=2^M$, and the value of M may be 10 or other numerical values.

The specific radio frames are evenly spaced, and $2^m$ is used to represent the number of the specific radio frames in the time unit or represent the interval of various specific radio frames. If $2^m$ is used to represent the number of the specific radio frames in the time unit, then the interval of various specific radio frames is $2^{M-m}$, vice versa, if $2^m$ is used to represent the interval of various specific radio frames, then the number of the specific radio frames in the time unit is $2^{M-m}$, where $0 \leq m \leq M+1$, and m=M+1 represents that the entire time unit has no specific subframe.

In step S805, the position information of the specific subframes is sent by sending the value of a signaling Np, where $0 \leq Np \leq R$, and Np represents the number of the specific subframes in the specific radio frame in which the signaling is located; and R represents that the radio frame contains R subframes that may be allocated to the specific service.

In the present embodiment, the allocation of the specific subframes is the same for every specific radio frame.

The information sent in the step S804 is the first information, the information sent in the step S805 is the second information, and the first information and the second information are transmitted on the broadcast channels. The specific transmission mode is the same as that of the embodiment one.

Preferably, the second information is transmitted on the main broadcast channel, and the first information is transmitted on the secondary broadcast channel or the dynamic broadcast channel.

The following paragraphs describe an example that the first information is transmitted on the secondary broadcast channel and the second information is transmitted on the broadcast channel.

The user equipment receives the main broadcast channel firstly to obtain the value of Np, thus knowing the length of the CP of each subframe in the radio frame in which the main broadcast channel is located. If the current radio frame includes the secondary broadcast channel, then the user equipment can solve the value of m, otherwise, the user equipment successively receives and checks the main broadcast channel until the secondary broadcast channel is found, and the value of m is solved.

When Np≠0, the user equipment may obtain the position information of the specific subframes in the time unit by combining the value of m. When Np=0, m=M+1 indicates that the time unit has no specific subframe, and thus the user equipment also obtains the information of the service that each subframe in the time unit is used for. When Np=0, if m≠M+1, the user equipment may obtain the position of the radio frame of Np≠0 according to the value of m, and reads the value of Np on the main broadcast channel in such radio frame, thus obtaining the position information of the specific subframes in the time unit.

It should be noted that Np may indicate the number of the specific subframes in any one designated radio frame. For example, Np can indicates the number of the specific subframes in the first or several radio frame next to the radio frame in which Np is located.

The user equipment may obtain the number of the specific subframes in the designated radio frame after receiving the value of Np. Then the user equipment may obtain the length of the CP of each subframe in the radio frame. Then, the procedures such as obtaining the value of m, checking whether Np is zero value, etc. by the user equipment are exactly the same as that of the above method. Finally, the user equipment may obtain nonzero values of Np and m, and thus obtain the position of the specific subframes in the time unit.

Preferably, the length information of the CP are transmitted together with the value of Np on the same channel.

Figure 9:
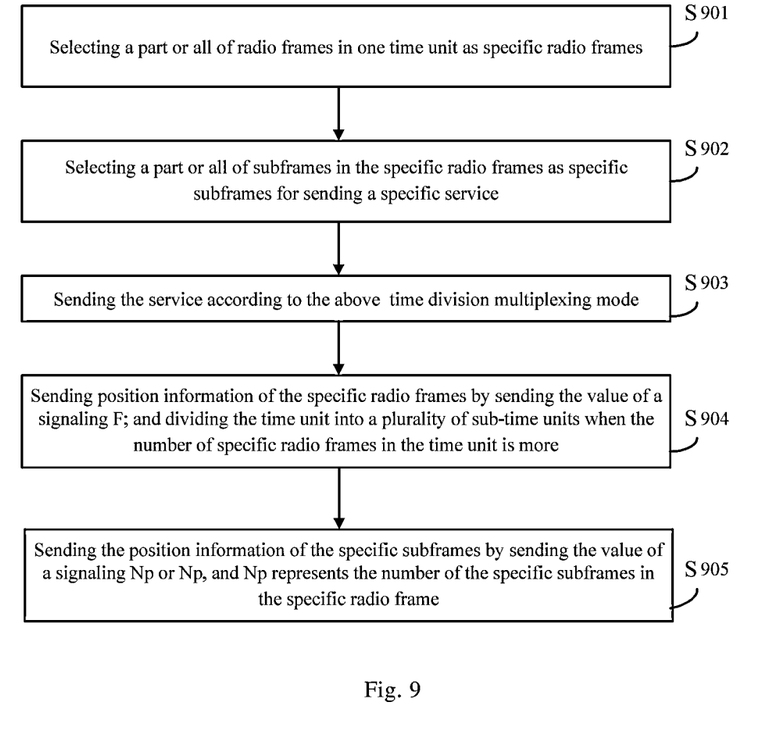
FIG. 9 is a schematic flow diagram of a method for transmitting service according to an embodiment of the present invention.

A fifth embodiment will be described now. Referring to FIG. 9, the method for transmitting service includes the following steps.

In step S901, a part or all of radio frames in one time unit are selected as specific radio frames.

In step S902, a part or all of subframes in the specific radio frames are selected as specific subframes for sending a specific service.

In step S903, the service is sent according to the above time division multiplexing mode.

In step S904, the position information of the specific radio frames is sent by sending the value of a signaling F. When the number of the specific radio frames in the time unit is more, the time unit is divided into several sub-time units. F represents the position information of the specific radio frames in the sub-time units. And, the position information of the specific radio frames in several sub-time units is the same. When the number of the specific radio frames in the time unit is less, F represents the position information of the specific radio frames in the time unit.

The present invention may be embodied in many different forms as follows, but should not be construed as limited to the embodiments set forth herein.

S successive radio frames form one time unit, where $S=2^M$ and the value of M may be 10 or other numerical values. The time unit is divided into $2^{M-M_0}$ sub-time units, and each sub-time unit consists of $2^{M_0}$, successive radio frames, and M0 is a positive integer smaller than M.

In step S904.1 (not shown), when the number of the specific radio frames in the time unit is more than or equals $2^{M-M_0}$, F represents the position information of the specific radio frames in the sub-time unit.

For example, F may represent a bitmap Fq of the radio frames in the sub-time unit, Fq consists of $2^{M_0}$ bits, each bit corresponds to one radio frame, and represents whether the corresponding radio frame is allocated to the specific service or not with two states which are 0 and 1.

Another example is that F may represent the number Fp of the radio frames in the sub-time unit, and $0 \leq Fp \leq 2^{M_0}$. The specific radio frames in a same sub-time unit are allocated according to a preset rule, for example, successive allocation or even allocation. If Fp specific radio frames are of approximate even allocation in the sub-time unit that the specific radio frames belong to, the method for determining the position of the radio frames is similar to the method for determining the specific subframes after knowing the value of Np in the embodiment one. If Fp specific radio frames are consecutively allocated in the sub-time unit that the specific radio frames belong to, then the positions of the specific radio frames can be determined according to a starting position $f_0$ of the successive Fp specific radio frames and the value of Fp. The starting position $f_0$ may be appointed or informed by signaling, particularly, $f_0$ may be appointed as 0.

In step S904.2 (not shown), when the number of the specific radio frames in the time unit is less than $2^{M-M_0}$, F represents the position information of the specific radio frames in the time unit.

Example 1, F can represent a bitmap Gq of the sub-time units in the time unit, Gq consists of $2^{M-M_0}$ bits, each bit corresponds to one sub-time unit, and represents whether the corresponding sub-time unit includes one specific radio frame or not with the two states which are 0 and 1. The positions of the specific radio frames are identical in various sub-time units that the specific radio frames respectively belong to, and the positions can be appointed or informed by the signaling.

Example 2, F can represent the number Gp of the specific radio frames in the time unit, $0 \leq Gp < 2^{M-M_0} \cdot 2^{M-M_0}$ and the allocation rules of the specific radio frames can be appointed or informed by the signaling. The following paragraphs provide three examples of appointed allocation rules.

(1) When Gp specific radio frames are appointed to be consecutively allocated in the time unit, the positions of the specific radio frames can be determined according to a starting position $g_0$ of the successive Gp specific radio frames and the value of Gp. The starting position $g_0$ can be appointed or informed by the signaling, particularly, $g_0$ may be appointed as 0.

(2) When Gp specific radio frames are appointed to be allocated in Gp successive sub-time units of the time unit, the positions of the sub-time units including the specific radio frames can be determined according to a starting position $g'_0$ of the Gp successive sub-time units and the value of Gp. The starting position $g'_0$ can be appointed or informed by the signaling, particularly, $g'_0$ may be appointed as 0. The positions of the specific radio frames are identical in various sub-time units that the specific radio frames respectively belong to. The position can be appointed or informed by the signaling. Particularly, the position may be a first radio frame in the sub-time unit.

(3) F represents the number $2^m$ of the specific radio frames in the time unit, and in the time unit, the specific radio frames are evenly allocated or consecutively allocated. Or F represents the interval $2^m$ of the specific radio frames in the time unit, and the specific radio frames are evenly allocated.

If $2^m$ is used to represent the number of the specific radio frames in the time unit, where $0 \leq m \leq M-M_0$ or $0 \leq m \leq M-M_0$, and $m=M-M_0$ is used to indicate that the entire time unit has no specific subframe, when the specific radio frames are evenly allocated, the interval is $2^{M-m}$; vice versa, if $2^m$ is used to represent the interval of various specific radio frames, then the number of the specific radio frames in the time unit is $2^{M-m}$, where $M_0 \leq m \leq M$ or $M_0 \leq m \leq M$, and $m=M_0$ is used to represent that the entire time unit has no specific subframe.

In step S905, the position information of the specific subframes is sent by sending the value of a signaling Np or the value of Nq, where Np represents the number of the specific subframes in the specific radio frame and $0 \leq Np \leq R$; R represents that the radio frame contains R subframes that may be allocated to the specific service; and Nq is a bitmap of the subframes in the specific radio frame. Specifically, Nq consists of R bits, each bit corresponds to one allocable subframe, and represents that whether the corresponding subframe is allocated to the specific service or not with two states which are 0 and 1.

In the present embodiment, the allocation of the specific subframes is the same for every specific radio frame.

After knowing the value of Np, if Np specific subframes are allocated at approximate equal interval in the specific radio frame that the specific subframes belong to, the method for determining positions of the specific subframes is exactly the same as that of the embodiment one. If Np specific subframes are consecutively allocated in the specific radio frame that the specific subframes belong to, then the positions of the specific subframes can be determined according to a starting position $r_0$ of successive Np subframes and the value of Np, and the starting position $r_0$ can be appointed or informed by the signaling, particularly, $r_0$ may be appointed as 0.

The information sent in the step S904 is the first information, the information sent in the step S905 is the second information, and the first information and the second information are transmitted on the broadcast channels. The specific transmission mode is the same as that of the embodiment one.

As value range of m is $0 \leq m \leq M+1$, and the value range of Np is $1 \leq Np \leq R$, the total bit number for transmitting the position information is $\lceil \log_2(M+2)+\log_2 R \rceil$.

The embodiment six is a multilayer embodiment, and specifically is as follows: when the number of the specific Type N' subunits in the time unit is more than or equals a threshold, the value of $n_0$ is determined, where $1 \leq N' \leq N$, $1 \leq n_0 \leq N$, $n_0$ has at least one value, which represents that all of the Type $n_0$ subunits in the specific Type $n_0-1$ subunit are the specific Type $n_0$ subunits, and the position information of the specific Type $n_0$ subunits is not sent any more. When the number of the specific Type N' subunits in the time unit is less than a threshold, the value of $n_0'$ is determined, where $1 \leq n_0' \leq N$, $n_0'$ has at least one value, which represents that the Type $n_0'-1$ subunit are directly divided into at least one Type $n_0'+1$ subunit, and the position information of the specific Type $n_0'$ subunits is not sent any more. The Type 0 subunit is the time unit, and the sizes of the Type n subunits do not change with the preceding operations.

For example, the time unit is divided into $2^{M-M_0}$ Type 1 subunits, both M and $M_0$ are nonnegative integers, and $M_0 \leq M$. Each Type 1 subunit is divided into $2^{M_0}$ Type 2 subunits, the Type 2 subunits are the radio frames, and Type 3 subunits are the subframes. Each Type 2 subunit is divided into at least one Type 3 subunit. In addition, the position information of the specific Type n subunits is sent by sending the value of the signaling F, where n=1 or n=2. When the number of the specific Type 2 subunits in the time unit is more than or equals $2^{M-M_0}$, $n_0=1$, and F represents bitmap and/or number and/or interval of the specific Type 2 subunits in each Type 1 subunit. When the number of the specific Type 2 subunits in the time unit is less than $2^{M-m_0}$ $n_0'=2$, and F represents bitmap and/or number and/or interval of the specific Type 2 subunits in the time unit. The position information of the Type 3 subunits is sent by sending the value of the signaling G, where G represents bitmap and/or number and/or interval of the specific Type 3 subunits in the specific Type 2 subunit that the specific Type 3 subunits belong to.

The present invention further provides a device corresponding to the service time division multiplexing method, a device corresponding to the method for transmitting service and a base station.

The service time division multiplexing device of the present invention includes a radio frame selection unit and a subframe selection unit.

The radio frame selection unit is configured to select a part or all of radio frames in one time unit as specific radio frames.

The subframe selection unit is configured to select a part or all of subframes in the specific radio frames as specific subframes for sending a specific service.

The device for transmitting service of the present invention includes a time division multiplexing unit and a transmission unit.

The time division multiplexing unit is configured to select a part or all of radio frames in one time unit as specific radio frames; and select a part or all of subframes in the specific radio frames as specific subframes for sending a specific service.

The transmission unit is configured to transmit the service according to a time division multiplexing mode determined by the time above division multiplexing unit and send position information of the specific radio frames and/or position information of the specific subframes.

The base station of the present invention includes a service transmission device.

The service transmission device is configured to select a part or all of radio frames in one time unit as specific radio frames, select a part or all of subframes in the specific radio frames as specific subframes for sending a specific service, send the service according to the above time division multiplexing mode, and send position information of the specific radio frames and/or position information of the specific subframes.

The following paragraphs provide several embodiments of the devices of the present invention.

Figure 10:
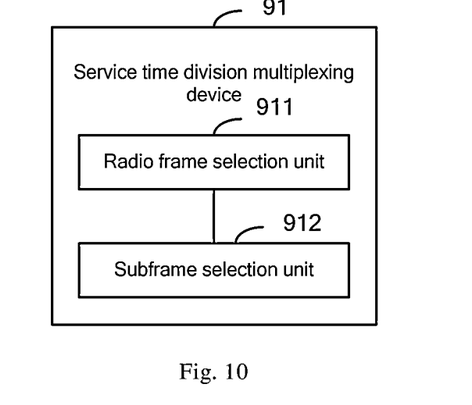
FIG. 10 is a schematic structural diagram of a device for service time division multiplexing according to an embodiment of the present invention.

Referring to FIG. 10, the service time division multiplexing device 91 according to one embodiment of the present invention includes a radio frame selection unit 911 and a subframe selection unit 912.

The radio frame selection unit 911 is configured to select a part or all of radio frames in one time unit as specific radio frames.

The subframe selection unit 912 is configured to select a part or all of subframes in the specific radio frames as specific subframes for sending a specific service.

The specific service is a multimedia broadcast multicast service, or a unicast service, or one or more than one kinds of services transmitted in broadcast or multicast mode.

Figure 11A:
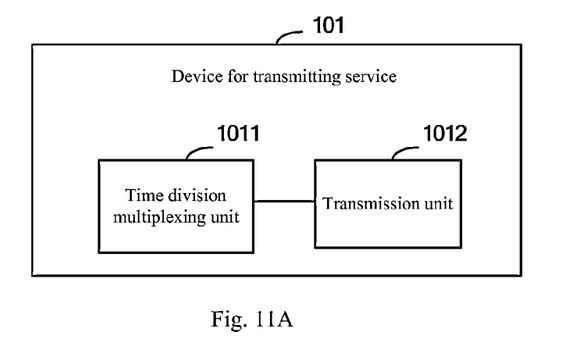
FIG. 11A is a schematic structural diagram of a device for transmitting service according to an embodiment of the present invention.

Referring to FIG. 11A, the device for transmitting service 101 according to one embodiment of the present invention includes a time division multiplexing unit 1011 and a transmission unit 1012.

The time division multiplexing unit 1011 is configured to select a part or all of radio frames in one time unit as specific radio frames and select a part or all of subframes in the specific radio frames as specific subframes for sending a specific service.

The specific service is a multimedia broadcast multicast service, or a unicast service, or one or more than one kinds of services transmitted in broadcast or multicast mode.

The transmission unit 1012 is configured to transmit the service according to a time division multiplexing mode determined by the above time division multiplexing unit 1011 and send position information of the specific radio frames and/or position information of the specific subframes.

Figure 11B:
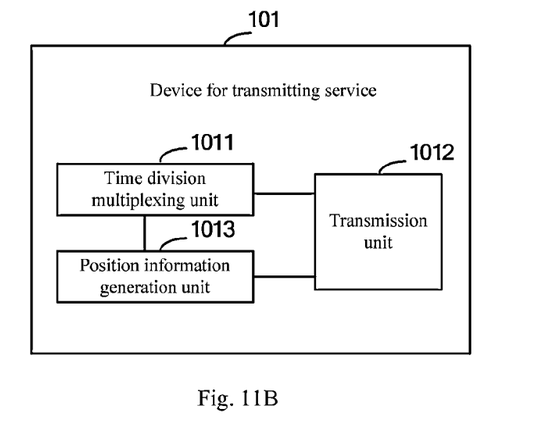
FIG. 11B is a schematic structural diagram of a device for transmitting service according to an embodiment of the present invention.

Preferably, referring to FIG. 11B, the device for transmitting service 101 according to one embodiment of the present invention further includes a position information generation unit 1013.

The position information generation unit 1013 is configured to generate the position information of the specific radio frames and/or the position information of the specific subframes according to the specific radio frames and the specific subframes selected by the time division multiplexing unit 1011.

Figure 12A:
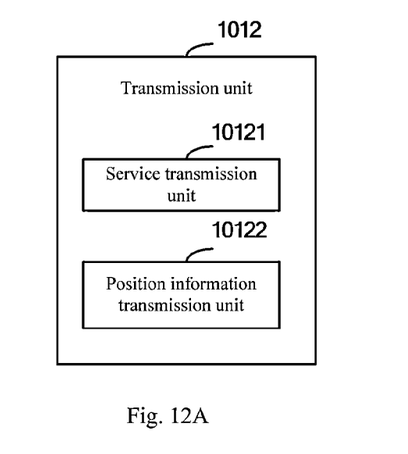
FIG. 12A is a schematic structural diagram of a transmission unit in an embodiment of a device for transmitting service of the present invention.

Preferably, referring to FIG. 12A, the transmission unit 1012 may include a service transmission unit 10121 and a position information transmission unit 10122.

The service transmission unit 10121 is configured to transmit the service according to the time division multiplexing mode determined by the above time division multiplexing unit 1011.

The position information transmission unit 10122 is configured to transmit the position information of the specific radio frames and/or the position information of the specific subframes.

Figure 12B:
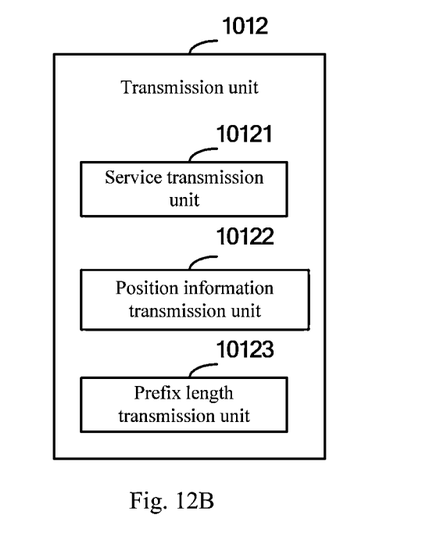
FIG. 12B is a schematic structural diagram of a transmission unit in an embodiment a device for transmitting service of the present invention.

Preferably, Referring to FIG. 12B, the transmission unit 1012 may further include a prefix length transmission unit 10123.

The prefix length transmission unit 10123 is configured to transmit information which indicates length of CPs of the specific subframes in the time unit.

Figure 13:
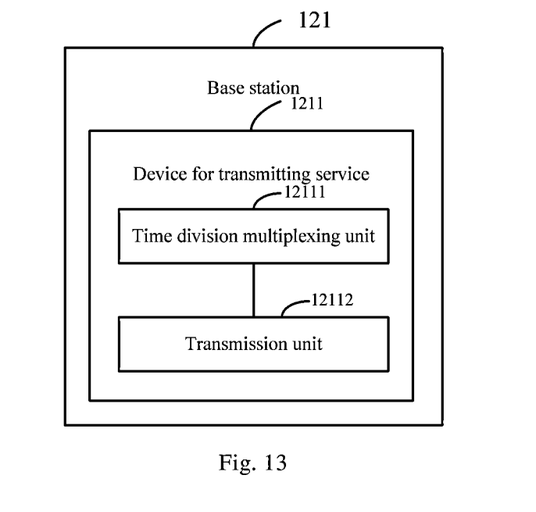
FIG. 13 is a schematic structural diagram of a base station according to an embodiment of the present invention.

Referring to FIG. 13, the base station 121 according to one embodiment of the present invention includes a device for transmitting service 1211.

The device for transmitting service 1211 includes a time division multiplexing unit 12111 and a transmission unit 12112.

The device for transmitting service 1211 is configured to select a part or all of radio frames in one time unit as specific radio frames; select a part or all of subframes in the specific radio frames as specific subframes for sending a specific service; send the service according to the above time division multiplexing mode; and send position information of the specific radio frames and/or position information of the specific subframes.

The specific service is a multimedia broadcast multicast service, or a unicast service, or one or more than one kinds of services transmitted in broadcast or multicast mode.

The time division multiplexing unit 12111 is configured to select a part or all of radio frames in one time unit as the specific radio frames and select a part or all of subframes in the specific radio frames as the specific subframes for sending the specific service.

The transmission unit 12112 is configured to transmit the service according to the time division multiplexing mode determined by the above time division multiplexing unit 12111 and send the position information of the specific radio frames and/or the position information of the specific subframes.

To sum up, the present invention provides a service time division multiplexing method and a service time division multiplexing device as well as a method and a device for transmitting service. Particularly, the present invention provides an MBMS and unicast service time division multiplexing method and a device thereof, as well as a method and a device for sending the MBMS and the unicast service, which prevents a unicast service user and an MBMS user from reading own service information in the transmission time of the other side, and saves electric energy for the user equipment. The method for informing the length of the CP of the subframe provided by the present invention ensures that the user equipment can exactly demodulate the subframes. The information transmission path, the information timing mode and the information source encoding mode provided by the present invention ensure that the user equipment can accurately obtain the transmission time of required service data and read the corresponding service data when the service data are sent in the case that the base station employs the MBMS and unicast service time division multiplexing mode, thus saving resources.

The specific service referred in the present invention includes a service with specific content or a service transmitted through a specific transmission mode, and also includes the service with the specific content and transmitted through the specific transmission mode.

The service transmitted through specific mode includes multiple types, for example, a service transmitted through a multimedia broadcast multicast mode, or a service transmitted through a unicast mode. The specific mode can also refer to an antenna configuration mode, a time frequency resource occupancy mode, a code resource occupancy mode, a space frequency occupancy mode, etc. The specific mode can also refer to a destination equipment of the service, for example, one or more than one kind of services transmitted to a certain specific user or a specific user group.

The service with the specific content includes any one or more than one kinds of multimedia broadcast multicast services, for example, streaming media services, data sharing services, etc. The service with the specific content can also include any one or more than one kinds of unicast services.

The service with the specific content and transmitted through a certain specific transmission mode can be inferred from the explanation of the specific mode and the specific content, for example, a voice service transmitted through the unicast mode.

Finally, it should be noted that the above embodiments are merely provided for describing the technical solutions of the present invention, but not intended to limit the present invention. It should be understood by those of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the scope of the present invention.

What is claimed is:

1. A method for communicating, comprising:
   receiving, by a user equipment (UE), a service sent by a base station, the service being sent in one or more subframes that are designated as specific subframes, the specific subframes being selected from one or more radio frames that are designated as specific radio frames, the specific radio frames being selected from a time unit, wherein the time unit comprises $2^M$ radio frames, each of the radio frames containing a number R of subframes that can be allocated to carry the service, where R is a natural number, and M is a nonnegative integer; and
   receiving, by the UE, position information of the specific radio frames in the time unit and position information of the specific subframes in the specific radio frame on a transport channel, wherein the transport channel is mapped to a physical shared data channel;
   wherein the position information of the specific radio frames in the time unit is represented by the number of the specific radio frames in the time unit; or the position information of the specific radio frames in the time unit is represented by an interval between two specific radio frames in the time unit,
   wherein the interval is $2^m$, and $0 \leq m \leq M$, or wherein the interval is the total number of the radio frames in the time unit divided by the number of the specific radio frames in the time unit.

2. The method of claim 1, wherein the service is a multimedia broadcast multicast service, or a unicast service, or one or more than one kinds of services transmitted in broadcast or multicast mode.

3. The method of claim 1, wherein the allocation of the specific subframes in a specific radio frame is the same for every specific radio frame.

4. The method of claim 3, wherein the specific subframes are evenly allocated in each of the specific radio frames and/or the specific radio frames are evenly allocated in the time unit.

5. A user equipment, comprising:
   circuitry configured to receive a service sent by a base station, the service being sent in one or more subframes that are designated as specific subframes, the specific subframes being selected from one or more radio frames that are designated as specific radio frames, the specific radio frames being selected from a time unit, wherein the time unit comprises $2^M$ radio frames, each of the radio frames contains a number R of subframes that can be allocated to carry the service, where R is a natural number, and M is a nonnegative integer; and circuitry configured to receive position information of the specific radio frames in the time unit and position information of the specific subframes in the specific radio frame on a transport channel, wherein the transport channel is mapped to a physical shared data channel;

wherein the position information of the specific radio frames in the time unit is represented by the number of the specific radio frames in the time unit; or the position information of the specific radio frames in the time unit is represented by an interval between two specific radio frames in the time unit, wherein the interval is $2^m$, $0 \leq m \leq M$, or wherein the interval is the total number of the radio frames in the time unit divided by the number of the specific radio frames in the time unit.

6. The user equipment of claim 5, wherein the service is a multimedia broadcast multicast service, or a unicast service, or one or more than one kinds of services transmitted in broadcast or multicast mode.

7. The user equipment of claim 5, wherein the allocation of the specific subframes in a specific radio frame is the same for every specific radio frame.

8. The user equipment of claim 7, wherein the specific subframes are evenly allocated in each of the specific radio frames; and/or the specific radio frames are evenly allocated in the time unit.

9. A method for communicating, comprising:
receiving, by a user equipment (UE), a service sent by a base station, the service being sent in one or more Type n+1 subunits that are designated as specific Type n+1 subunits, the specific Type n+1 subunits being selected from one or more Type n subunits that are designated as specific Type n subunits, wherein each Type n subunit is divided into at least one Type n+1 subunit, and the Type 1 subunits are divided from a time unit, where $1 \leq n \leq N$, and n and N are natural numbers; and receiving, by the UE, position information of the Type n+1 specific subunits in the Type n subunits;

wherein the position information of the specific Type 1 subunits is a bitmap or a number or an interval of the specific Type 1 subunits in the time unit, and the position information of the specific Type n+1 subunits is a bitmap or a number or an interval of the Type n+1 subunits in each of the specific Type n subunits.

10. The method of claim 9, wherein the service is a multimedia broadcast multicast service, or a unicast service, or one or more than one kinds of services transmitted in broadcast or multicast mode.

11. The method of claim 9, wherein the specific Type 1 subunits are evenly allocated in the time unit.

12. The method of claim 9, wherein the specific Type n+1 subunits are evenly allocated in each of the specific Type n subunits.

13. A user equipment, comprising:
circuitry configured to receive a service sent by a base station, the service being sent in one or more Type n+1 subunits that are designated as specific Type n+1 subunits, the specific Type n+1 subunits being selected from one or more Type n subunits that are designated as specific Type n subunits, wherein each Type n subunit is divided into at least one Type n+1 subunit, and the Type 1 subunits are divided from a time unit, where $1 \leq n \leq N$, and n and N are natural numbers; and circuitry configured to receive position information of the Type n+1 specific subunits in the Type n subunits, wherein the position information of the specific Type 1 subunits is a bitmap or a number or an interval of the specific Type 1 subunits in the time unit, and the position information of the specific Type n+1 subunits is a bitmap or a number or an interval of the Type n+1 subunits in each of the specific Type n subunits.

14. The user equipment of claim 13, wherein the service is a multimedia broadcast multicast service, or a unicast service, or one or more than one kinds of services transmitted in broadcast or multicast mode.

15. The user equipment of claim 13, wherein the specific Type 1 subunits are evenly allocated in the time unit.

16. The user equipment of claim 13, wherein the specific Type n+1 subunits are evenly allocated in each of the specific Type n subunits.

* * * * *